United States Patent
Grad et al.

(10) Patent No.: US 8,777,790 B2
(45) Date of Patent: Jul. 15, 2014

(54) CONTINUOUSLY VARIABLE TRANSMISSION DEVICE HAVING POWER SPLIT

(75) Inventors: Karl Grad, Ruderting (DE); Jurgen Pohlenz, Ravensburg (DE); Gerhard Bailly, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 127 days.

(21) Appl. No.: 13/637,400

(22) PCT Filed: Feb. 14, 2011

(86) PCT No.: PCT/EP2011/052093
§ 371 (c)(1),
(2), (4) Date: Sep. 26, 2012

(87) PCT Pub. No.: WO2011/128125
PCT Pub. Date: Oct. 20, 2011

(65) Prior Publication Data
US 2013/0023370 A1    Jan. 24, 2013

(30) Foreign Application Priority Data
Apr. 14, 2010   (DE) .......................... 10 2010 003 941

(51) Int. Cl.
*F16H 3/72* (2006.01)
*B60K 6/445* (2007.10)
*B60K 6/48* (2007.10)
*F16H 37/08* (2006.01)

(52) U.S. Cl.
CPC ............. *F16H 3/728* (2013.01); *Y02T 10/6239* (2013.01); *Y02T 10/6221* (2013.01); *F16H 2200/2012* (2013.01); *F16H 2200/2043* (2013.01); *F16H 2037/0886* (2013.01); *F16H 3/725* (2013.01); *B60K 6/445* (2013.01); *B60K 6/48* (2013.01)
USPC .............................................................. 475/5

(58) Field of Classification Search
CPC ............ F16H 3/72; F16H 3/727; F16H 3/728
USPC .............................................................. 475/5
See application file for complete search history.

(56) References Cited

U.S. PATENT DOCUMENTS 6,251,037 B1 * 6/2001 Baumgaertner et al. .......... 475/2
7,311,629 B2   12/2007 Vornehm et al.
(Continued)

FOREIGN PATENT DOCUMENTS

DE        39 35 228 A1   4/1991
DE        41 24 479 A1   1/1993
(Continued)

OTHER PUBLICATIONS

German Search Report Corresponding to DE 10 2010 003 941.1.
(Continued)

*Primary Examiner* — Edwin A Young
(74) *Attorney, Agent, or Firm* — Davis & Bujold, PLLC; Michael J. Bujold

(57) ABSTRACT

A continuously variable transmission device (1) has a power split which takes place in the area of a sum planetary transmission (9). A first shaft (8) of the sum planetary transmission (9) can be brought into operational connection with a drive engine or machine (3). A second shaft (12) of the sum planetary transmission (9) can be connected, for continuous variation of the gear ratio, with an electric machine (36) which itself can be coupled with an electric energy source (38).

12 Claims, 10 Drawing Sheets

(56) References Cited

U.S. PATENT DOCUMENTS

| | | | |
|---|---|---|---|
| 2008/0182694 A1* | 7/2008 | Holmes | 475/5 |
| 2008/0189018 A1 | 8/2008 | Lang et al. | |
| 2009/0157269 A1* | 6/2009 | Matsubara et al. | 701/54 |
| 2009/0227408 A1* | 9/2009 | Imamura et al. | 475/5 |
| 2010/0170732 A1 | 7/2010 | Glaser et al. | |
| 2011/0256973 A1 | 10/2011 | Werner et al. | |

FOREIGN PATENT DOCUMENTS

| | | |
|---|---|---|
| DE | 198 10 374 A1 | 9/1999 |
| DE | 101 28 076 A1 | 12/2002 |
| DE | 10 2005 039 461 A1 | 3/2007 |
| DE | 103 58 114 A1 | 7/2007 |
| DE | 10 2007 022 774 A1 | 11/2008 |
| DE | 10 2007 051 473 A1 | 4/2009 |
| DE | 10 2009 019 485 A1 | 6/2010 |
| EP | 0 769 404 A1 | 4/1997 |
| EP | 0 941 883 A2 | 9/1999 |
| WO | 2007/031396 A1 | 3/2007 |

OTHER PUBLICATIONS

International Search Report Corresponding to PCT/EP2011/052093.
Written Opinion Corresponding to PCT/EP2011/052093 (English Translation of Comments).
International Preliminary Report on Patentability Corresponding to PCT/EP2011/052093 (English Translation of Comments).

* cited by examiner

CONTINUOUSLY VARIABLE TRANSMISSION DEVICE HAVING POWER SPLIT

This application is a National Stage completion of PCT/EP2011/052093 filed Feb. 14, 2011, which claims priority from German patent application serial no. 10 2010 003 941.1 filed Apr. 14, 2010.

FIELD OF THE INVENTION

The invention concerns a continuously variable transmission device with a power split.

BACKGROUND OF THE INVENTION

In DE 101 28 076 A1 and in FIG. 1, a transmission device that is known in the state of the art is shown having a vehicle drive train with a drive machine or rather a combustion engine and an output. The transmission device has an assigned variator, which is designed as a hydrostatic device, for continuous variation of gear ratios of a transmission device. Torque which is provided by a drive machine is introduced into the transmission device by way of a transmission input and is guided from the transmission device in the direction of the output by way of a transmission output shaft.

The torque of the drive machine which is present in the area of the transmission input is introduced, via a first shaft which is designed as a ring gear, into the transmission device through a summing planetary transmission which is designed as a simple planet gear. By means of the summing planetary transmission, so-called power branching of the drive torque of the drive machine is executed, whereby the torque of the first shaft of the summing planetary transmission is brought to an additional shaft on which again planetary gears are rotatably positioned. The planetary gears mesh with a second shaft of the summing planetary transmission which is designed as a sun gear, and which in this case is operationally connected, via a spur gear, with the variator.

On the output side of the transmission, the variator is operationally connected with a transmission shaft which is connected in a rotationaly fixed manner, via a gear chain, through a first shaft of the summing planetary transmission, where the transmission shaft extends essentially with its complete axial length through the transmission device and where at the output side the different users, preferably a construction vehicle or an agricultural vehicle, can be supplied by the drive machine with the torque. Through a spur gear, the second shaft of the summing planetary transmission is coupled with the first shaft of the variator, while the first shaft of the summing planetary transmission is operationally connected, via the shaft and the gear chain, with a second shaft of the variator.

In addition to the summing planetary transmission, a transmission device is presented having three additional planetary transmissions, and five friction locking shift elements of a shift transmission, where friction locking shift elements are friction clutches and another friction locking shift element is a brake.

The first shaft of the summing planetary transmission is connected in a rotationaly fixed manner with a planetary carrier of the first planetary transmission. In addition, the additional shaft of the summing planetary transmission is coupled in a rotationally fixed manner with a planetary carrier of the second planetary transmission and a ring gear of the first planetary transmission. A sun gear of the first planetary transmission is connected in a rotationaly fixed manner with a sun gear of the second planetary transmission.

The planetary carrier of the summing planetary transmission, the ring gear of the first planetary transmission which is connected in a rotationaly fixed manner with it, and also the planetary carrier of the second planetary transmission which is connected in a rotationaly fixed manner with it, can be coupled in a rotationally fixed manner via the third friction locking shift element with a planetary carrier of the third planetary transmission. The planetary carrier of the third planetary transmission is connected in a rotationaly fixed manner with the transmission output shaft. In an engaged operating condition of the fourth friction locking shift element, the additional shaft of the summing planetary transmission, together with the ring gear of the first planetary transmission and the planetary carrier of the second planetary transmission, are coupled in a rotationally fixed manner with a sun gear of the third planetary transmission, while a ring gear of the third planetary transmission, in an engaged operating condition of the brake, is connected in a rotationally fixed manner with a transmission housing mounted part.

When engaging the first friction locking shift element, a ring gear of the second planetary transmission is connected in a rotationaly fixed manner with the sun gear of the third planetary transmission, while the sun gears of the planetary transmissions, when the second friction locking shift element is engaged, are rotationally fixed with the sun gear of the third planetary transmission.

The previously described transmission device is disadvantageously characterized, due to the allocated hydrostatic device, as requiring a large construction are and having a large manufacturing cost. In addition, the transmission device, due to the cooling and lubricant needs of the hydrostatic device for the hydraulic supply system of the transmission device and also due to bearing, gearing, and drag losses, can only be operated in the realm of the hydrostatic power path and in the operational range of the transmission device with an undesired, reduced efficiency. Also, the parts of the transmission device, due to the variator or hydrostatic device vibration excitation, are exposed to a larger load which disadvantageously affects the lifespan.

Also, the transmission device, at lower operating temperatures of the hydrostatic device, can only be operated to its full extent after the hydrostatic device has finished time-consuming warm up phases.

SUMMARY OF THE INVENTION

Thus, the present invention has the task to provide a construction space favorable, continuously variable transmission device with power split in which the previously mentioned disadvantages of the known, state of the art continuously variable transmission devices can be avoided in a simple and cost-effective way.

In this inventive continuously variable transmission device with power split which takes place in the area of a summing planetary transmission, the first shaft of the summing planetary transmission can be brought into an operating connection with a drive machine. A second shaft of the summing planetary transmission can be connected with an electric machine for a continuous variation of the gear ratio, and the electric machine can be coupled with an electric energy source.

Due to the construction of the inventive continuously variable transmission device with an electric machine for the continuous variation of the gear ratio instead of a variator, designed as a hydrostatic device, the inventive continuously variable transmission device, compared to a known state of the art transmission device, can be constructed so as to require a smaller construction space in the radial or in the axial direction. In addition, the inventive transmission device, due to the elimination of the hydrostatic unit and its drive system which comprises drive wheels, shafts, bearings, and enclosure parts, can be manufactured at a lower cost.

The inventive continuously variable transmission device, in comparison to the known state of the art transmission devices, can also be operated at a higher efficiency because drive power losses can be reduced across the entire operating range of a vehicle due to elimination of the cooling and lubricant needs of the hydrostatic unit in the hydraulic supply system of the transmission device and therefore the respective avoidance of bearing, gearing, and drag losses in the area of the hydrostatic power path.

The transmission components of the inventive continuously variable transmission device are, in comparison to the known transmission device, exposed to lower loads due to the elimination of mechanical and hydraulic vibration excitation of the hydrostatic unit which improves the lifetime of the inventive transmission device.

Also, the electric machine, which is coupled to the summing planetary transmission, can be operated as a generator preferably in the push operation of the vehicle up to nearly a standstill of the vehicle, and therefore enhances the efficiency of a drive train which is equipped with a transmission device and improves recuperation operation.

A vehicle which is equipped with the inventive continuously variable transmission device, as compared to the known state of the art transmission device, can be operated at higher spontaneity because the time-consuming warm-up phase before operation of the hydrostatic device of the known transmission device can begin is not required.

In an especially construction space favorable and low emission favorable embodiment of the inventive transmission device, the electric energy source has a fuel cell.

If the electric energy source comprises an electric machine which can be brought into an operating connection with a combustion engine, the electric machine, which is connected with the summing planetary transmission for the continuous variation of the gear ratio of the transmission device, can be overall supplied with electric energy for a respectively longer time duration.

By designing the drive machine as an electric machine, the continuously variable transmission device of the vehicle can also be operated in the reverse direction without the need for an additional mechanical rotation reversing unit just by reversing the direction of rotation of the electric machine, simplifying construction and reducing costs.

The drive machine which is designed as an electric machine can be electrically coupled to the energy source and preferably also with the second shaft of the summing planetary transmission of the electric machine such that, depending on the respective operating state, the drive train that comprises the inventive continuously variable transmission device which allows the exchange of electric energy between the electric motor and a vehicle drive train can be operated at high efficiency.

If the drive machine is designed as a combustion engine, there is a simple way to couple the electric machine of the electric energy source with it and to design the drive machine and the electric machine of the electric energy source, which is operationally connected with the combustion engine, as one common unit. As an alternative, there is also the possibility that the drive machine and the electric machine of the electric energy source, which are in operational connection with the combustion engine, are separate combustion engines.

If the drive machine can be connected, via a friction engaging shift element, with a first shaft of the summing planetary transmission, then depending of the state of operation, the drive machine can be separated from the first shaft of the summing planetary transmission, whereby unwanted introduction of the drag torque, created in the area of the drive machine into the transmission device, can be avoided in a simple way.

In the construction space favorable embodiments of the inventive continuously variable transmission device, the electric machines are at least in some areas positioned axially next to each other and/or radially within each other.

A cost favorable, additional embodiment of the inventive continuously variable transmission device has a common cooling circuit of the electric machines.

If each of the electric machines can be coupled, via a transmission, with the summing planetary transmission, matching the rotational speed of the rotor to an optimal operating range of the electric machines can each be realized in a simple and cost favorable way.

In an additional, advantageous embodiment of the continuously variable transmission device, the electric energy source has an electric storage device where electric energy, which is generated during the operation but is not actually needed for driving an electric machine or for the a supply of an onboard circuitry, can be temporarily stored in the area of the electric storage device to enable an additional improvement of the efficiency.

An additional embodiment of the inventive continuously variable transmission device, characterized by a high power density, is a shift transmission which is connected with the third shaft of the summing planetary transmission and which comprises several planetary transmission devices, where their shafts, for the creation of different gear ratio ranges in which the gear ratio is in each case continuously variable via the summing planetary transmission and its connected electric machine, can be preferably connected via friction engaging shift elements.

The first shaft of the summing planetary transmission is, in an additional embodiment of the inventive continuously variable transmission device, also characterized by a high power density, connected with the first shaft of a first planetary transmission device of the shift transmission, while the third shaft of the summing planetary transmission is connected with a second shaft of the first planetary transmission device and with a first shaft of a second planetary transmission device of a shift transmission.

The characteristics in the following embodiments of the inventive continuously variable transmission device can, by themselves or in combination with each other, each be used to extend the inventive matter. The respective combinations of the characteristics represent no limitation in regard to the extension of the inventive matter, and mainly show just examples of characteristics.

Additional advantages and advantageous embodiments of the inventive transmission device arise from the following, principally presented embodiments and with references to the drawing, whereby in the description of the different embodiments, in favor of clarity, the different embodiments for the same construction and function use the same reference characters.

BRIEF DESCRIPTION OF THE DRAWINGS

It shows.

DETAILED DESCRIPTION OF THE PREFERRED EMBODIMENTS

Figure 1:
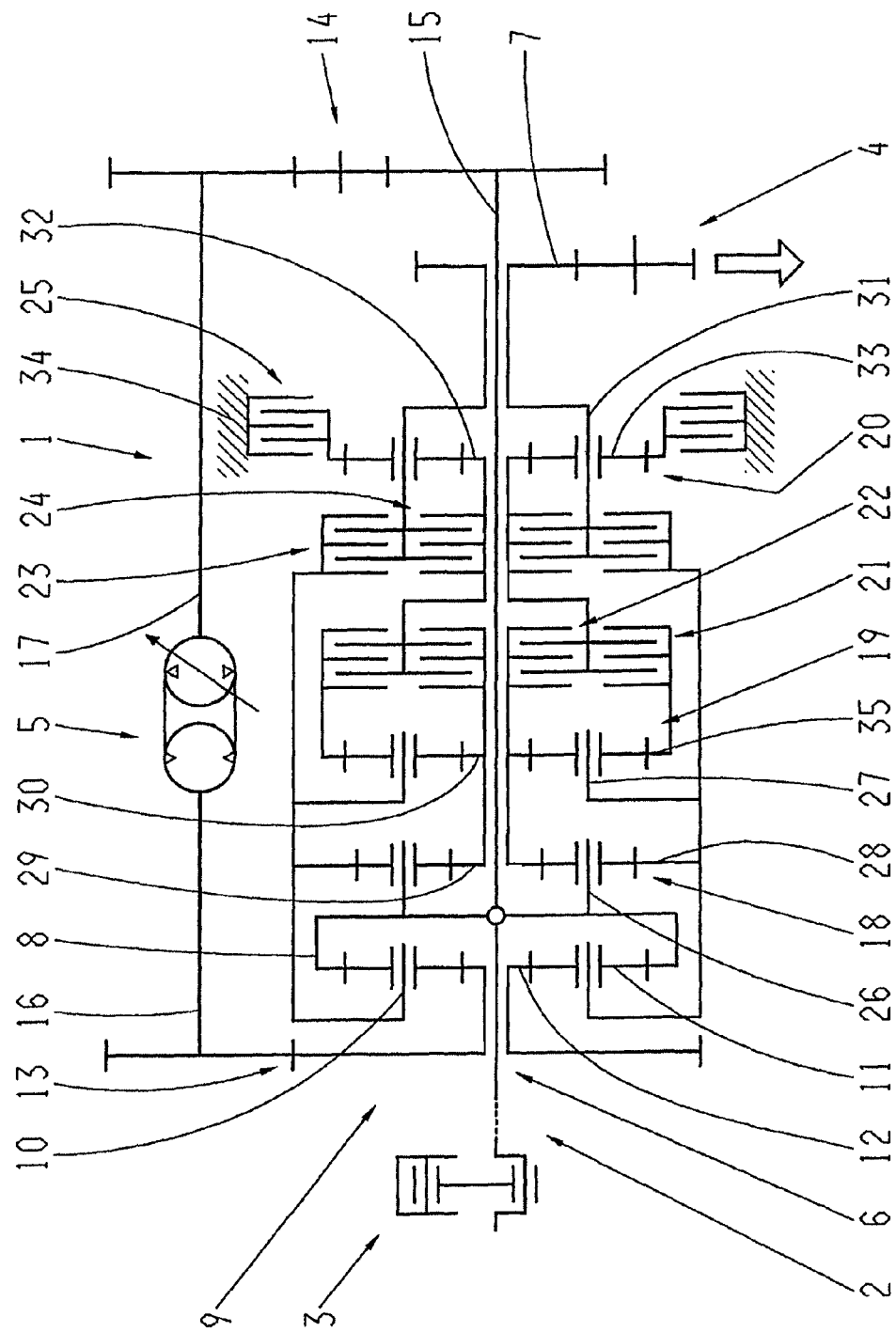
FIG. 1 a heavily schematized presentation of a drive train of a motor vehicle with a gear wheel schematic of a state of the art transmission device.
Figure 2:
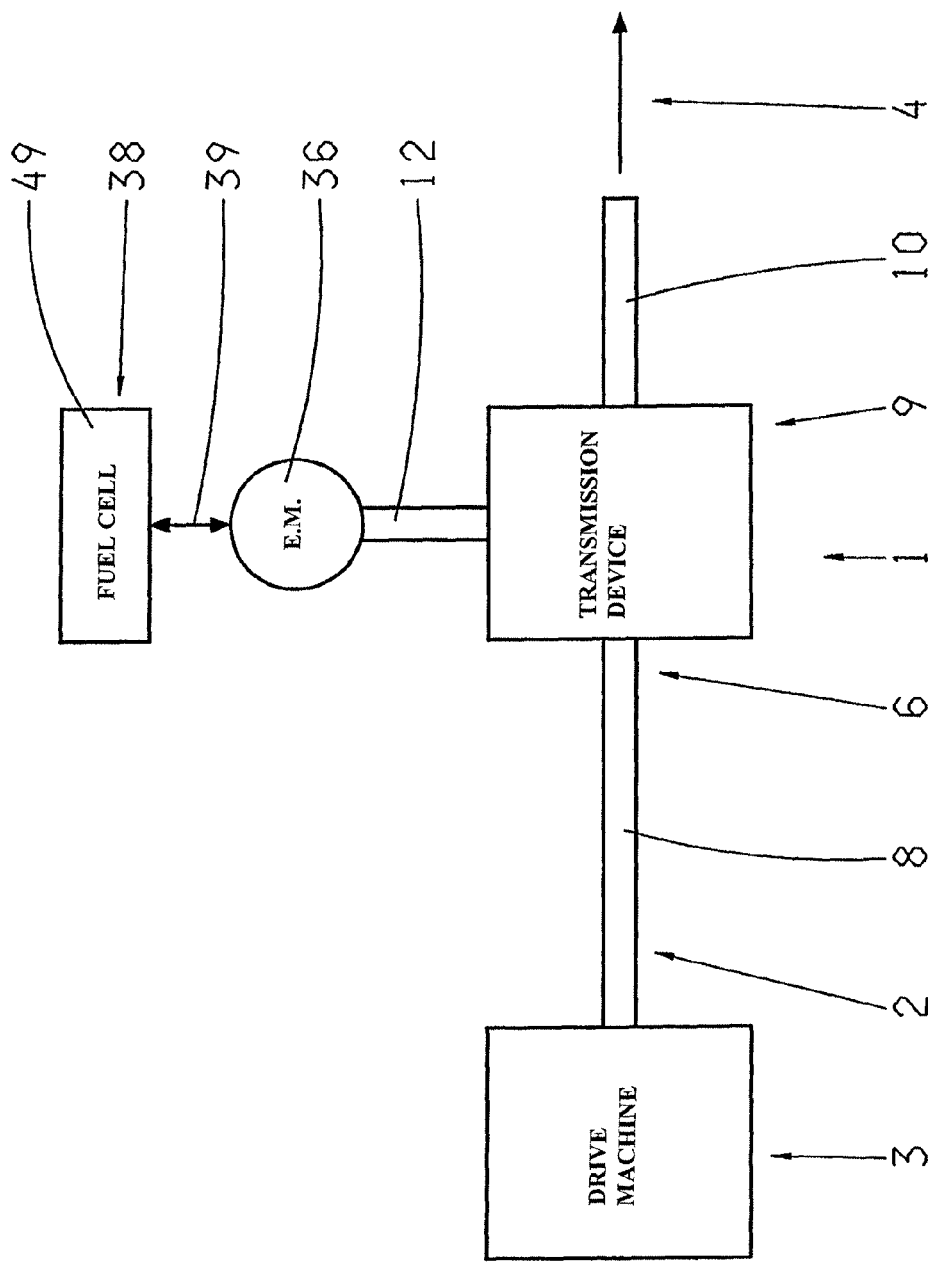
FIG. 2 a block diagram of a portion of an inventive transmission device.

FIG. 2 shows a partial schematic view of a first embodiment of the inventive transmission device 1, in which the first shaft 8 of the summing planetary transmission 9 is in operational connection with a drive machine 3 which is designed as an electric machine, and the electric machine 36 with the shaft 12 of the summing planetary transmission 9 for the continuous variation of the gear ratio of the transmission device 1 which is connected with an electric machine 36. The electric machine 36 can be operated as a motor as well as a generator. Furthermore, the electric machine 36 is also coupled, via in the electric connection 39, with the electric energy source 38 which here comprises a fuel cell 49 which is the area where the necessary energy can be created for the motor operation of the electric machine 36. Next, the shaft 10 of the summing planetary transmission 9 can be brought into an operating connection with the output 4, and the drive machine 3 can preferably also be supplied with energy by the energy source 38.

Basically, operating the electric machine 36 as the motor or generator varies the rotational speed of the second shaft 12 of the summing planetary transmission 9 and thus, the gear ratio of the continuously variable transmission device 1 is continuously varied whereby the drive torque, which is provided by the drive machine 3, can be transferred in accordance with the modified amount in the output direction via an additional shaft 10 or the third shaft of the summing planetary transmission 9, respectively.

Figure 3:
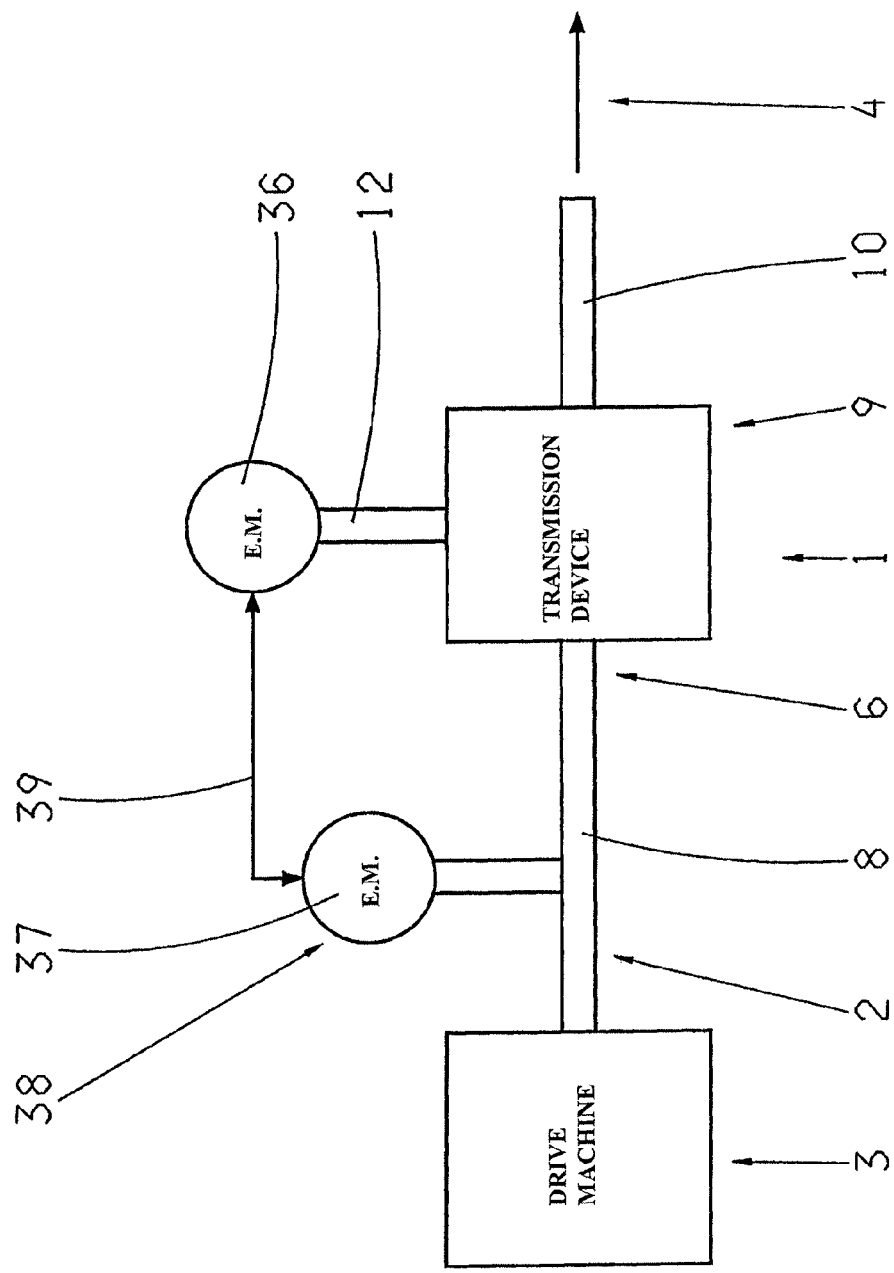
FIG. 3 a presentation in accordance with FIG. 2 of an additional embodiment of the inventive transmission device.

FIG. 3 shows an additional partial schematic view of a second embodiment of the inventive continuously variable transmission device 1 with a power split which takes place in the area of the summing planetary transmission 9. The first shaft 8 of the summing planetary transmission is in an operating connection with the drive machine 3. The second shaft 12 of the summing planetary gear 9 is connected with the electric machine 36 for the continuous variation of the gear ratio of the transmission device 1. The electric machine 36 is hereby coupled with an electrical energy source 38 which comprises an electric machine 37, wherein the electric machine 37 is operationally connected, in the area of the transmission input 6, with the drive machine 3.

The drive machine 3 is designed as a combustion engine where its drive torque is introduced, via the shaft 8 of the summing planetary transmission 9, into the transmission device 1. When the machine 37 of the electric energy source 38 is operated as a generator, part of the drive torque of the drive machine 3 is used to generate electric energy which can be brought via an electric connection 39 to the electric machine 36 during motor operation of the electric machine 36. When the electric machine 36 is operating as a generator, the hereby generated energy can be directed to the electric energy source 38 via an electric connection 39 of the electric machine 37, and when the electric machine 37 is operating as a motor the torque can be introduced into the power flow between the drive machine 3 and the summing planetary gear 8, preferably for driving the vehicle.

Figure 4:
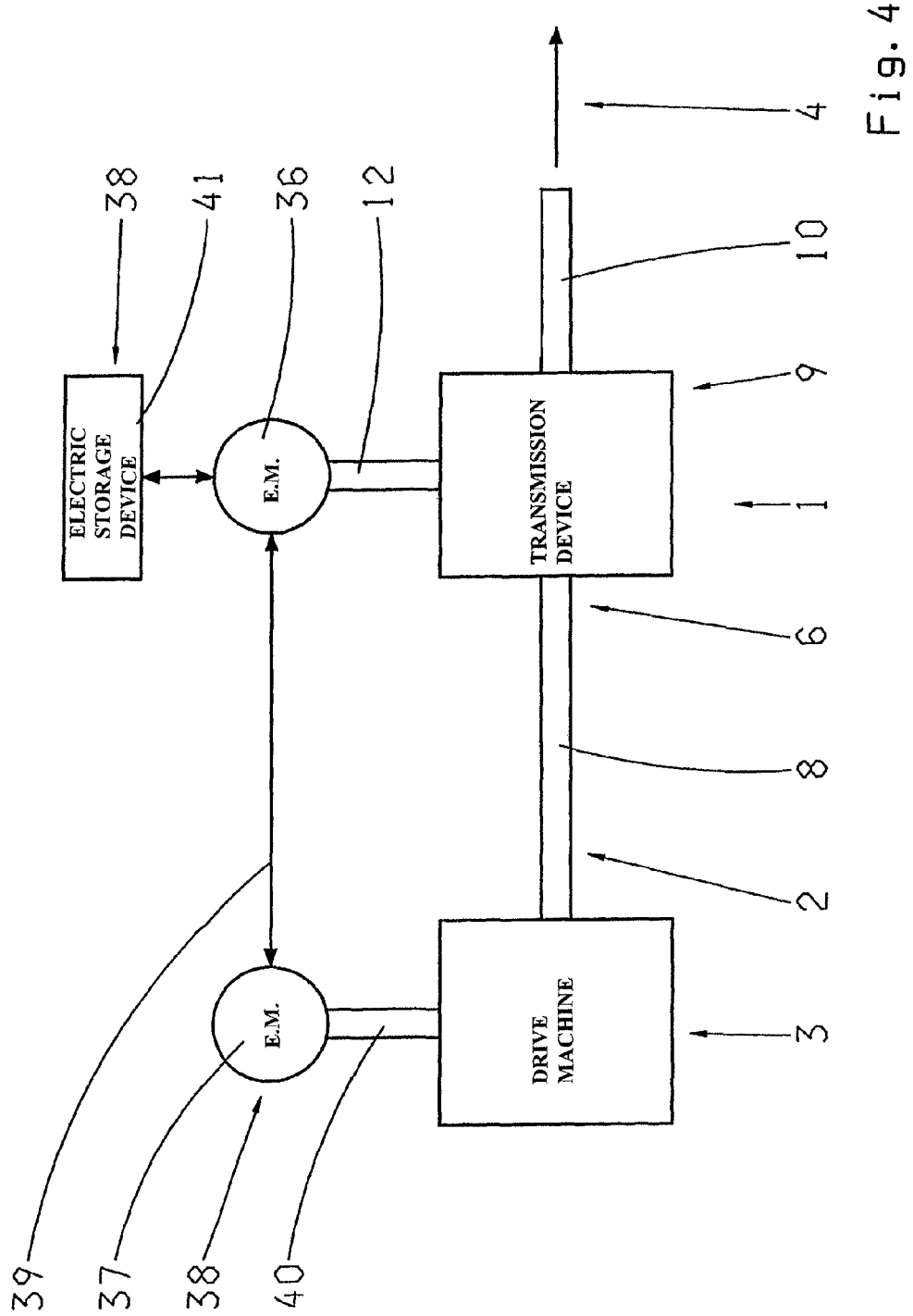
FIG. 4 a presentation in accordance with FIG. 2 of a third embodiment of the inventive transmission device.

In the additional embodiment of the inventive transmission device 1 as shown in FIG. 4, the electric machine 37, via a shaft 40 which is separate from the first shaft 8 of the summing planetary transmission 9, is also operationally connected with the drive machine 3 which is designed as a combustion engine, and electrically coupled with the electric machine 36 as previously described. The electric energy source 38, besides the electric machine 37, comprises an electric storage device 41 in which the generated electric energy of the electric machines 36 and 37 can be temporarily stored and supplies the electric machine 36 as well as electric machine 37 with electric energy.

Figure 5:
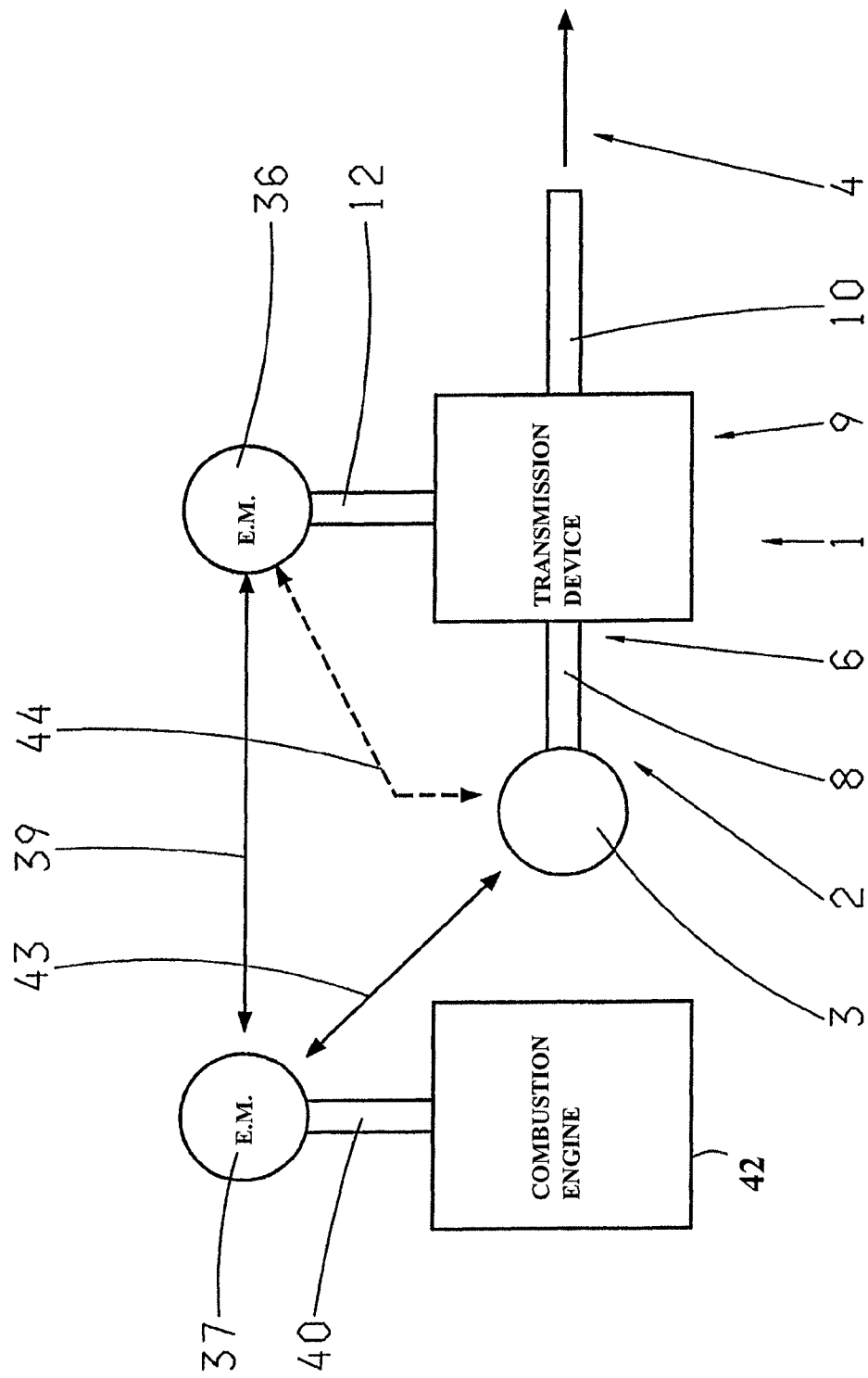
FIG. 5 a presentation in accordance with FIG. 2 of a fourth embodiment of the inventive transmission device.

FIG. 5 shows an enhancement of the drive system illustrated in FIG. 4, in which the drive machine 3 is designed as an electric machine 37. The electric machine 37 of the electric energy source 38 is here connected with a combustion engine 42, such that drive of the electric machine 37 through the combustion engine and simultaneous motor drive of the electric machine 37 generates electric energy. This electric energy which is created through the electric machine 37 can be transferred, via the electric connection 39, to the electric machine 36.

Simultaneously, the electric machine 37 of the electric energy source 38 is connected, via an additional electric connection 43, with the drive machine 3 which is designed as an electric machine. In addition, the drive machine 3 and the electric machine 36 are also coupled via the additional electric connection 44. The drive system which is shown in FIG. 5 can generate current through the combustion engine 42 which can be converted here through the drive machine 3 into a drive torque. At the same time, the electric current which is generated in the area of the machine 37 can be used for the motor operation of the electric machine 36.

Figure 6:
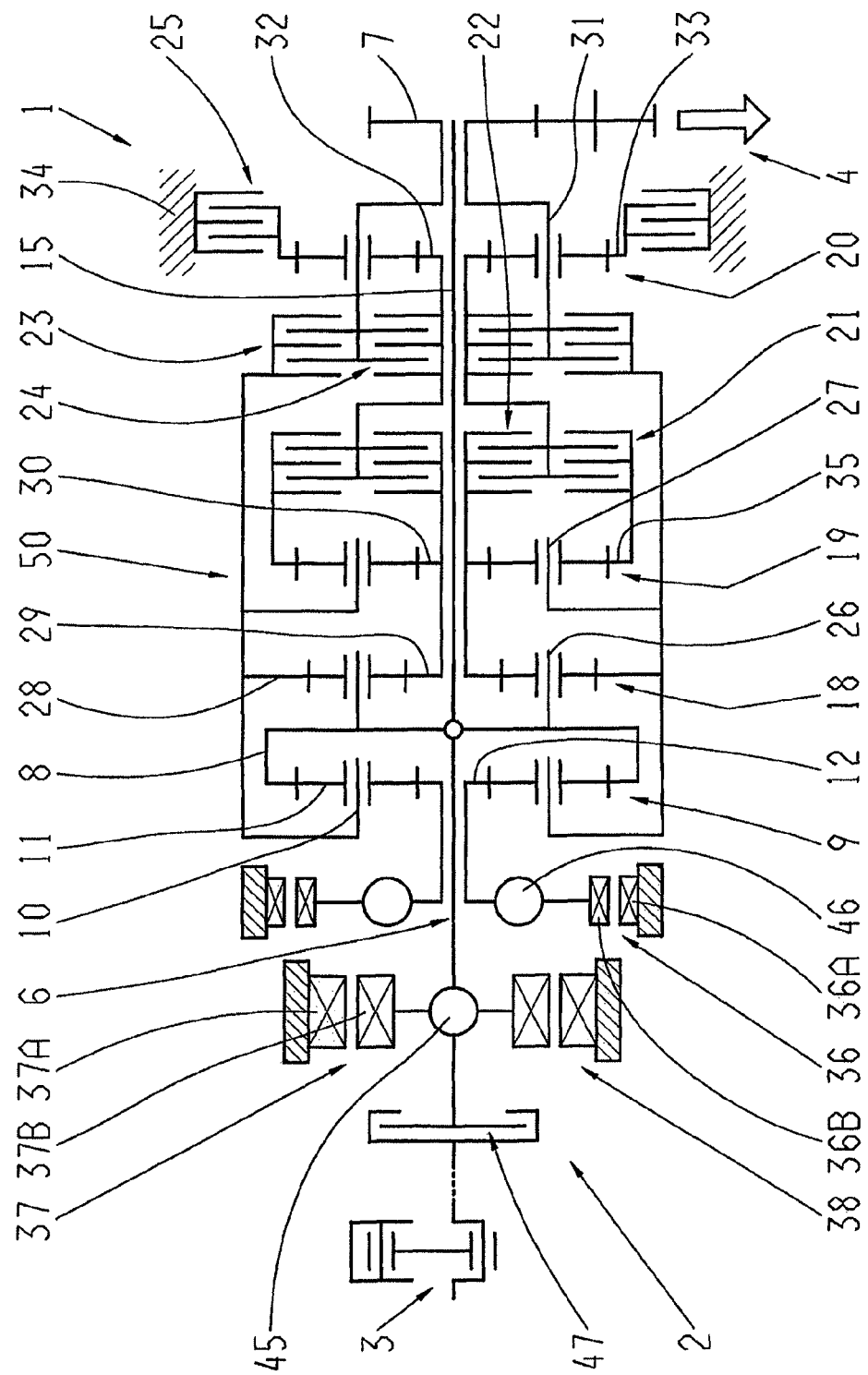
FIG. 6 in accordance with FIG. 1, a presentation in principle of the embodiment of the inventive transmission device shown in FIG. 3.

A detailed presentation of the principle in FIG. 4 of the embodiment of the inventive transmission device 1 shows in FIG. 6 the electric machine 37 of the electric energy source 38 connected, via a transmission 45, with the first shaft 8, which is designed as a ring gear, of the summing planetary transmission 9 so that a rotor rotational speed can be matched with the optimal operating range of the electric machine 37. The electric machine 36 is, via an additional transmission 46, coupled with the second shaft 12 of the summing planetary gear 9 which is designed as a sun gear and which can also be operated at an optimum.

The electric machines 36 and 37 of the transmission device 1, in accordance with FIG. 6, are positioned axially next to each other, which characterizes the transmission device 1 in the radial direction with the need for just little construction space. In addition, a separation clutch 47 is provided between the electric machine 37 and the drive machine 3, which is designed as a combustion engine, to engage or disengage the drive machine 3, depending on the operating condition, from the transmission device 1.

Therefore, the possibility exists, during a pure electric drive operation through the electric machine 37 and/or the electric machine 36, to avoid possible drag torque, via the drive machine 3 which is preferably turned off, to be introduced into the following drive train of a vehicle and to operate a vehicle in the pure electric drive operation at a high efficiency.

When the friction engaging shift elements 21 to 25 are disengaged, the flow of power between the transmission input 6 and the output 4 is interrupted in the area of the transmission device 1 so that, at an engaged separation clutch 47 and the respective motor operation of the electric machine 37, it can be used as the starter for a start procedure of the drive machine 3.

If the electric machine 36 is turned off accordingly, possible drag torques during the start procedure of the drive machine 3 are reduced in a simple way because electromagnetic torque transfer in the area of the electric machine 36 is avoided in a simple way.

There exists for instance the possibility to supply, via the transmission shaft 15, additional work machinery, preferably designed as an agricultural vehicle, starting from the drive machine 3 of the electric machine 37, with a torque whereby also during a pure work machinery drive mode the electric machine 36 can be turned off for reducing drag torque.

As an alternative, the possibility exists also to support a starting procedure of the drive machine 3 through the engagement of the friction connected shift elements 21 and 22 and thus simultaneous blocking of the summing planetary transmission 9 in the motor operation of the electric machine 36.

Also, a vehicle which is equipped with the transmission device 1 can, with a disengaged separation clutch 47 and the respective rotation direction of the electric machine 37 and an accordingly activated friction engaging shift element 21 to 25, be operated in reverse gear without a reversing transmission unit following the transmission device 1, which allows the design of the transmission device 1 in a space saving, cost-saving, and lightweight construction.

Figure 7:
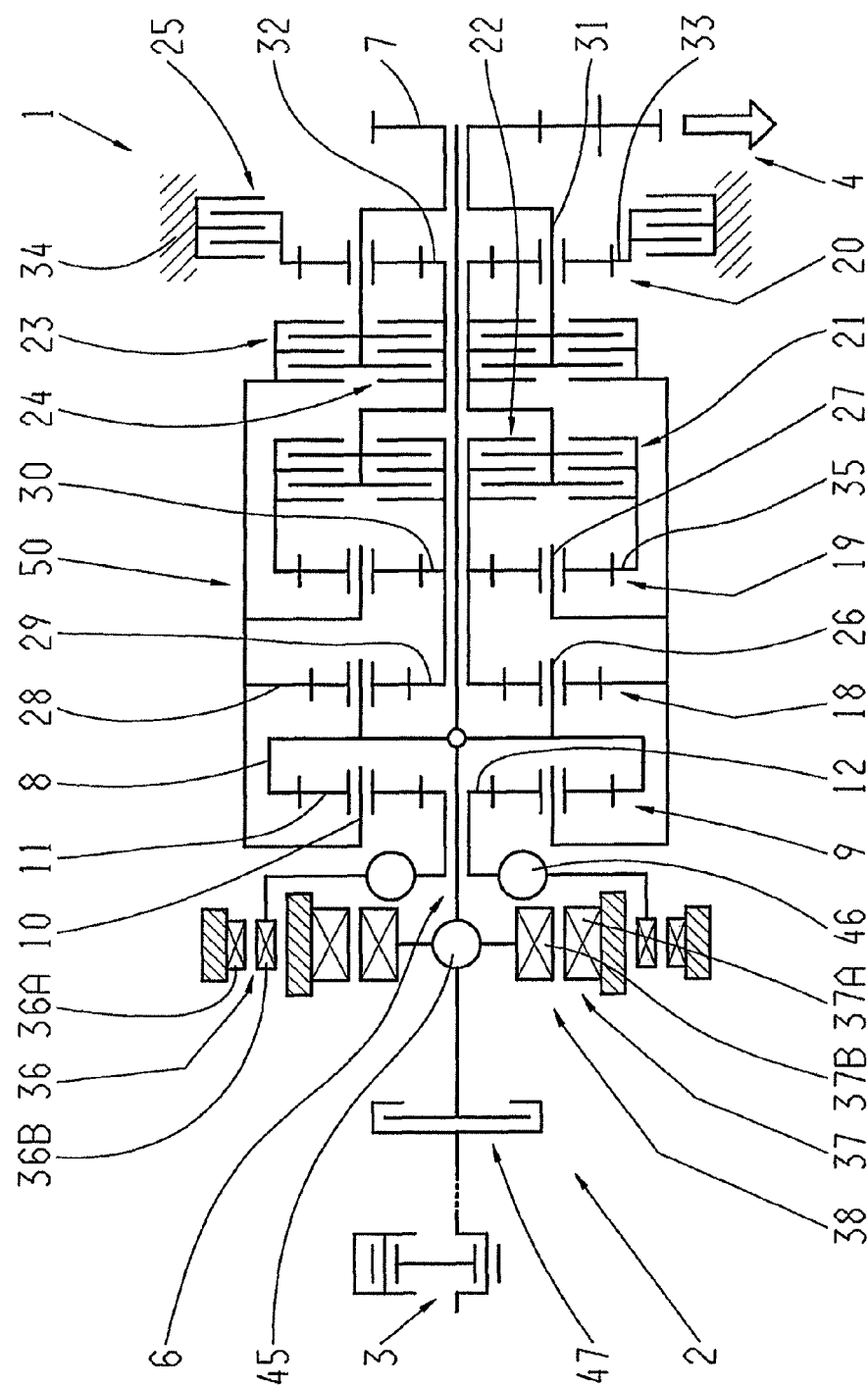
FIG. 7 in accordance with FIG. 6, a presentation of an additional embodiment of the inventive transmission device.

The additional embodiment of the inventive continuously variable transmission device 1 as illustrated in FIG. 7 corresponds mainly—except for the positioning of the electric machine 36 and 37—with the embodiment as shown in FIG. 6, as such in the following and in particular only the differences are mentioned and also, other than the additional functionality of the transmission device 1 according to FIG. 7, the previous description is the reference.

In the design of the transmission device according to FIG. 7, the electric machine 37 is positioned radially inside of the electric machine 36, for which reason the transmission device 1 has a larger need in the radial direction for construction space than the transmission device 1 in accordance with FIG. 6. In the axial direction, the transmission device 1 according to FIG. 7, is characterized by a lesser need for construction space than the transmission device 1 in accordance with FIG. 6.

Figure 8:
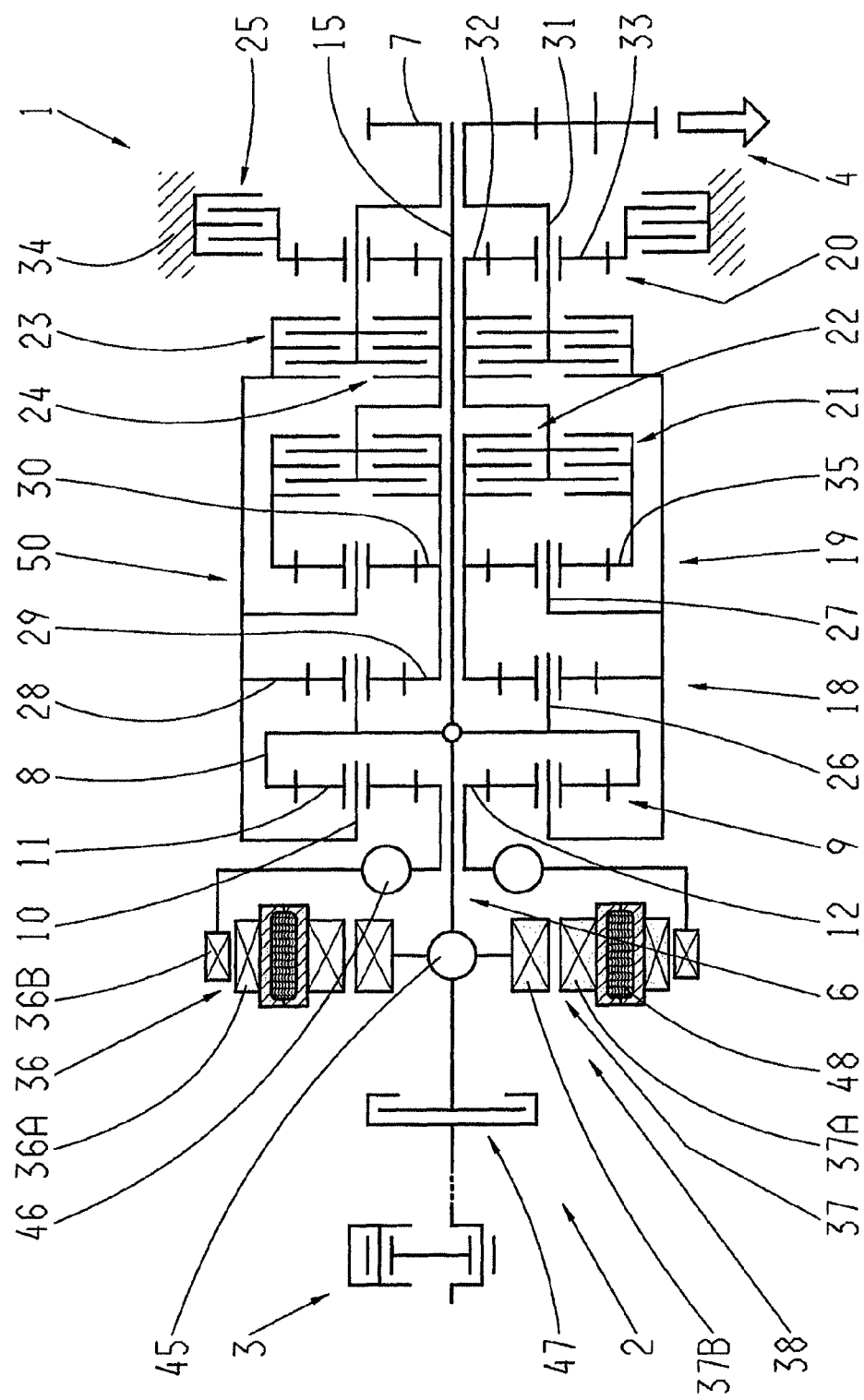
FIG. 8 in accordance with FIG. 6, a presentation of an additional embodiment of the inventive transmission device.

FIG. 8 shows a further embodiment of the transmission device 1 in accordance with FIG. 7, in which the electric machine 36 and the electric machine 37 have a common cooling circuit 48. In the transmission device 1 in accordance with FIG. 8, the integrated positioning of the electric machines 36 and 37, beside the axial construction space reduction, is used for a cost favorable design of common functions and features of the electric machines 36 and 37, whereby the common cooling circuit 48 is made possible through common positioning of the stators 36A, 37A and the rotors 36B, 37B of the electric machines 36 and 37.

The configurations of the electric machines 36 and 37 presented in FIG. 7 and FIG. 8 can, in reference to each other and depending on the respective, presented application, also deviate in a way that the electric machine 36 is positioned within the electric machine 37.

Figure 9:
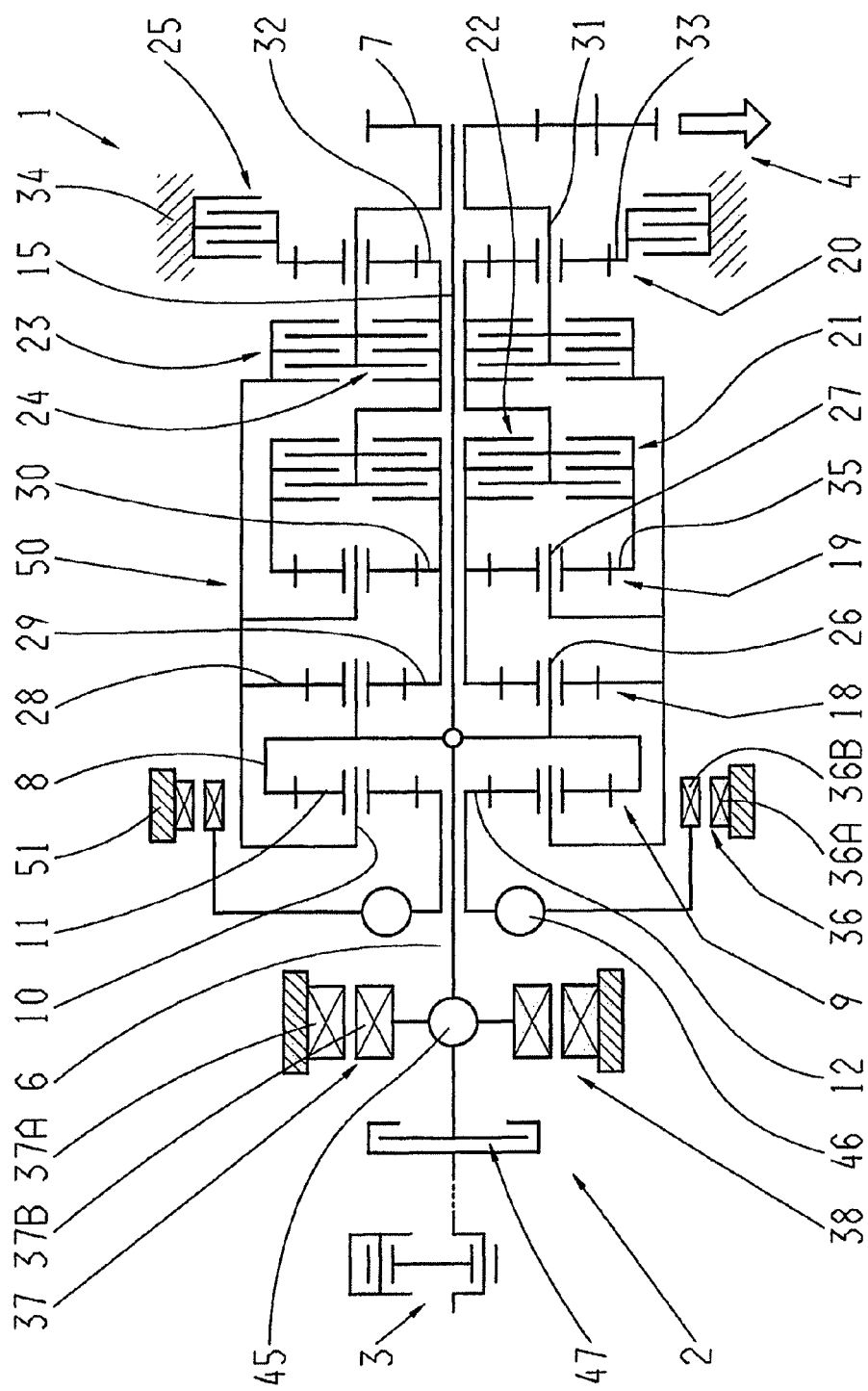
FIG. 9 in accordance with FIG. 6, a presentation of an additional embodiment of the inventive transmission device.

The additional embodiment of the inventive transmission device as presented in FIG. 9 is characterized by an additional positioning of the electric machines 36 and 37 in reference to each other and in reference to the summing planetary transmission 9, whereby the electric machine 37 is axially positioned in front of the summing planetary transmission 9 and radially surrounds the electric machine 36 of the summing planetary transmission 9. The configuration of the electric machine 36 presents a comparable construction space favorable realization of a maximum diameter of the rotor 36B of the electric machine 36 in the space between the planetary roller, or the summing planetary transmission 9, respectively, and a transmission housing 51 of the transmission device 1. The stator 36A of the electric machine 36 can be positioned in a simple way fixed to the transmission enclosure 51, so that the bearing and cooling functions, such as heat dissipation as well as an integration of cooling channels or similar, can be located in the transmission housing 51.

Due to the existing possibility, in the area of the separation clutch 47, to disengage the drive machine 3, which is designed as a combustion engine, in the embodiments of the transmission device 1 presented in FIG. 5 to FIG. 8, the output rotation direction in the area of the output for can be reversed without additional mechanical components in the transmission device 1, such as a reversing planet gear or counter gear box, to achieve forward drive operation or reverse drive operation. The reverse drive operation is made possible through the respective drive triggering of the electric machine 37 and/or of the electric machine 36, whereby the required electric drive power is provided by the electric machine 37 when operating as a generator or an additional generator as in the transmission device 1 in accordance with FIG. 5, in the drive system in conjunction with an additional combustion engine or from an electric storage, such as a battery. Also, by the respective amount of energy stored, an emission-free, electro-magnetic drive operation is possible without dragging the drive machine 3 which is designed as a combustion engine and at a disengaged separation clutch 47, for a limited time interval.

If the electric machine 37 is not connected with the transmission input 6 and if the transmission input 6 or the shaft 8, respectively, of the summing planetary transmission 9 can be freely rotated, reverse drive operation can be realized by blocking the summing planetary transmission 9, meaning with an engaged friction engaging shift element 23 and 24, in conjunction with a simultaneously engaged friction locking shift element 21 or engaged friction locking shift element 22, in the motor operation of the electric machine 36 with a reduced output torque.

As an alternative, reverse drive operation can also be performed via the electric machine 36 at a freely rotatable transmission input 6, when the friction connected shift elements 21 and 22, as well as the brake 25 are simultaneously engaged.

If the electric machine 37 is connected with the transmission input 6 as illustrated in FIG. 6 to FIG. 9, the full functionality of the continuously variable transmission device 1 is also available during the reverse drive operation. That means that all available, variable gear ratio ranges of the transmission device 1 can be utilized at a large pull force and that a vehicle which is equipped with the transmission device 1, in accordance with FIG. 6 to FIG. 9, can also be operated at high speed in reverse mode.

Figure 10:
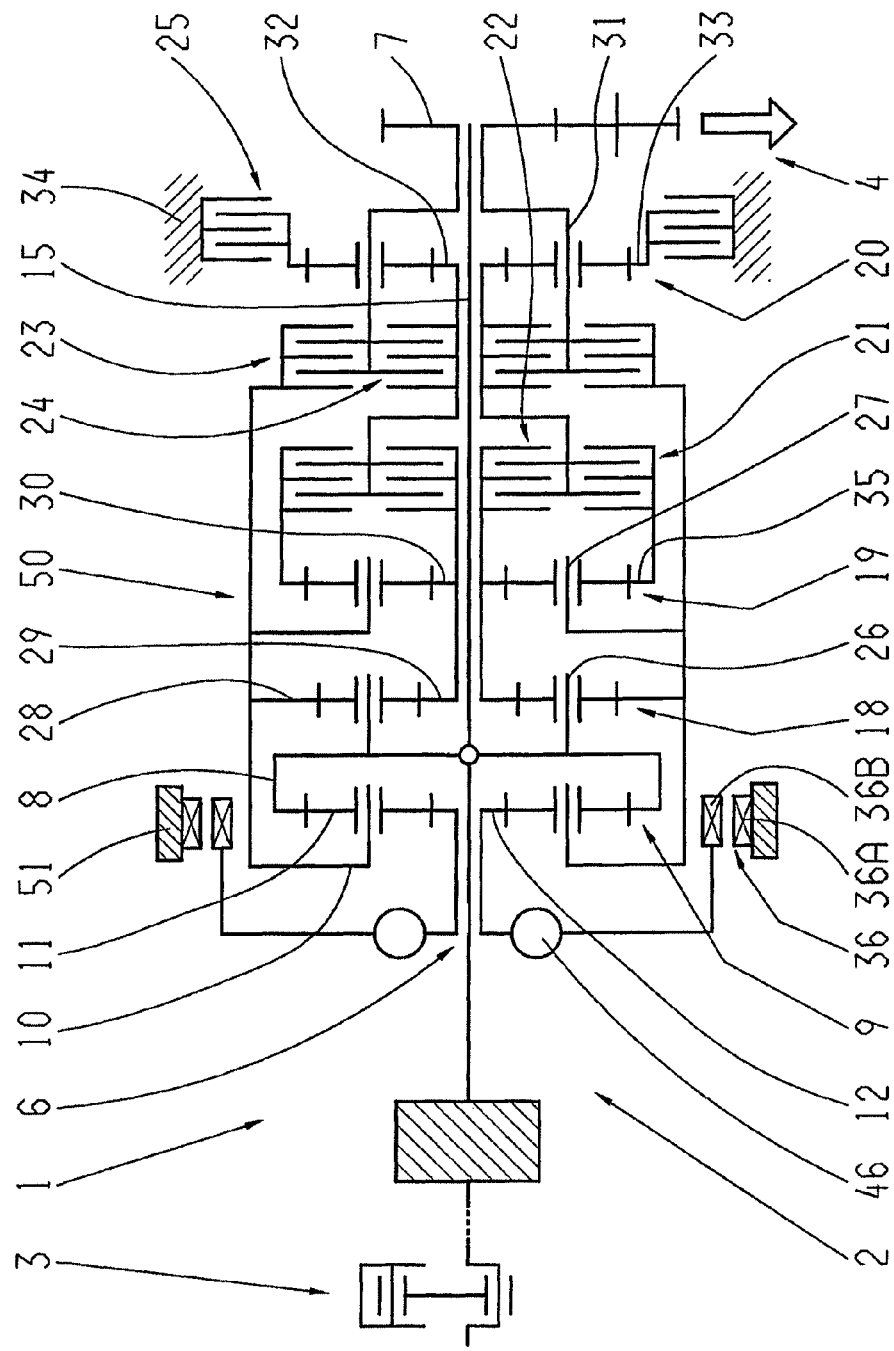
FIG. 10 a gear wheel schematic of an embodiment of the inventive transmission device.

FIG. 10 shows a detailed presentation of the drive train system as illustrated in FIG. 4, in which the electric machine 37 is not positioned in the area of the transmission input 6 and is not directly connected to it. In this embodiment of the transmission device 1, the full transmission functionality can also be used during a reverse drive operation, if the transmission input 6, for instance, during respective operation of the drive machine 3, meaning when the combustion engine is turned-off, is maintained to be rotationally fixed and when at the output a respective output torque is provided by the electric machine 36.

The transmission structure as presented in FIG. 6 to FIG. 10 of the inventive transmission device 1 is in each case coupled with the electric machine 37 which is connected with the drive machine 3 which is designed as a combustion engine and the first shaft 8 of the summing planetary transmission 9. The transmission device 1 is, beside the summing planetary transmission 9, in each case designed with the three additional planetary gear sets 18, 19, and 20 to provide, in conjunction with the frictionally connected shift elements 21 to 25, several gear ratio ranges.

Dependent on each of the applications, it is possible to design the transmission device 1 with a lower amount of planetary gear sets and frictionally connected shift elements, whereby here a reduced amount of gear ratio ranges is available. Again as an alternative, to replace the planetary gear sets 18, 19, and 20 of the shift transmission 50 with other, suitable transmission elements by which, in combination with shift elements, different gear ratio ranges can be achieved.

The electric machines 36 and 37 of the inventive transmission device 1 are each integrated with an electronic control system of the transmission device 1 so that during operation of the transmission device 1, during which the sun gear 12 or the second shaft of the summing planetary transmission 9, respectively, needs to be driven for the continuous variation of the gear ratio of the transmission device 1 within the gear ratio ranges, the electric machine 37 is operated as a generator and the electric power is transferred to the electric machine 36 which is operated as a motor. The required electric drive power which is needed for the operation of the electric machine 36 can alternatively or additionally be provided by an electric storage system, such as an electric storage device 41.

During operating conditions of the transmission device 1, at which the sun gear 12 of the summing planetary transmission 9 needs to be decelerated to a certain rotational speed, the electric machine 36 is then operated as a generator and the generated electric power in the area of the electric machine 36 is, for instance transferred to the electric storage device 41, to an electric user in the vehicle, or to the electric machine 37 which is operated as a motor.

REFERENCE CHARACTERS

1 Transmission Device
2 Vehicle Drive Train
3 Drive Machine
4 Output
5 Variator
6 Transmission Input
7 Transmission Output Shaft
8 First Shaft of the Summing planetary transmission
9 Summing planetary transmission
10 Third Shaft of the Summing planetary transmission
11 Planetary Gear
12 Second Shaft of the Summing planetary Transmission
13 Spur Gear Teeth
14 Wheel Chain
15 Transmission Shaft
16 First Shaft of the Variator
17 Second Shaft of the Variator
18 to 20 Planetary transmission
21 to 25 Friction Locking Shift Element
26 Planetary Carrier
27 Planetary Carrier
28 Ring Gear
29 Sun Gear
30 Sun Gear
31 Planetary Carrier
32 Sun Gear
33 Ring Gear
34 Fixed Transmission Housing Mounted Part
35 Sun Gear
36 Electric Machine
36A Stator
36B Rotor
37 Electric Machine
37A Stator
37B Rotor
38 Electric Energy Source
39 Electric Connection
40 Shaft
41 Electric Storage Device
42 Combustion Engine
43 Further Electric Connection
44 Additional Electric Connection
45 Transmission
46 Additional Transmission
47 Separation Clutch
48 Common Cooling Circuit
49 Fuel Cell
50 Shift Transmission
51 Transmission Housing

The invention claimed is:

1. A continuously variable transmission device (1) comprising:
a power split which takes place in an area of a sum planetary transmission (9), the sum planetary transmission comprising first and second drive input shafts and a third shaft,
the first drive input shaft (8) of the sum planetary transmission (9) being operationally connectable with a drive machine (3)designed as a first electric machine such that the first drive input shaft is driven by the first electric machine,
the second drive input shaft (12) of the sum planetary transmission (9) being connectable for a continuous variation of gear ratios with a second electric machine (36) which is connectable with the first electric machine, the first electric machine being electrically coupled to an electric energy source (38)
and thereby coupled, via the second electric machine, with the second drive input shaft (12) of the sum planetary transmission (9),
the third shaft (10) being a drive output shaft of the sum planetary transmission (9) and a drive input element of a shift transmission, the third shaft being connectable, via the shift transmission, with an output (4) of the continuously variable transmission, the shift transmission (50) comprises a plurality of planetary transmission devices (18, 19, 20) and their shafts which enable different gear ratio ranges in which each of the gear ratios is continuously variable, via the sum planetary transmission (9) and the second electric machine (36) which are connectable to the output of the continuously variable transmission via shift elements (21 to 24).

2. The continuously variable transmission device according to claim 1, wherein the electric energy source (38) has a fuel cell (49).

3. The continuously variable transmission device according to claim 1, wherein the electric energy source (38) comprises the first electric machine (37) which is operationally connectable with an engine.

4. The continuously variable transmission device according to claim 3, wherein the engine is connectable, via a friction locking shift element (47), with the first electric machine and the first drive input shaft (8) of the sum planetary transmission (9).

5. The continuously variable transmission device according to claim 1, wherein the electric energy source (38) has an electric storage device (41).

6. The continuously variable transmission device according to claim 1, wherein the first drive input shaft (8) of the sum planetary transmission (9) is a ring gear.

7. The continuously variable transmission device according to claim 6, wherein the second drive input shaft (12) of the sum planetary transmission (9) is a sun gear.

8. The continuously variable transmission device according to claim 1, wherein the third shaft (10) of the sum planetary transmission (9) is a planetary carrier.

9. The continuously variable transmission device according to claim 8, wherein the shift elements (21 to 24) are friction locking shift elements (21 to 24).

10. The continuously variable transmission device according to claim 9, wherein the drive output shaft (10) of the sum planetary transmission (9) is connected with a first shaft (28) of a first planetary transmission device (18) of the shift transmission (50) and with a first shaft (27) of a second planetary transmission device (19) of the shift transmission (50).

11. The continuously variable transmission device according to claim 1, wherein the first drive input shaft (8) of the sum planetary transmission (9) is a ring gear, the second drive input shaft (12) of the sum planetary transmission (9) is a sun gear and the drive output shaft (10) of the sum planetary transmission (9) is a planetary carrier.

12. A continuously variable transmission device comprising:
    a sum planetary transmission comprising a ring gear, a sun gear and a planet carrier, and the sum planetary transmission facilitating a power split in the continuously variable transmission device;
    the ring gear being a first drive input element of the sum planetary transmission and being connectable with a drive machine comprising a first electric machine;
    the sun gear being a first drive input element of the sum planetary transmission and being connected with a second electric machine for facilitating continuous variation of gear ratios,
    the second electric machine being coupled with an electric energy source; and
    the planet carrier being a drive output of the sum planetary transmission and being connectable with an output of the continuously variable transmission and being connected with a shift transmission which comprises a plurality of planetary transmission devices, so as to enable different gear ratio ranges in which the gear ratios being continuously variable, via the sum planetary transmission and the second electric machine which are connected to the shift transmission and being connectable, via shift elements, with the output of the continuously variable transmission.

* * * * *